(12) United States Patent
Hasegawa

(10) Patent No.: US 6,847,894 B1
(45) Date of Patent: Jan. 25, 2005

(54) VEHICLE CONTROL SYSTEM, PROGRAM AND METHOD

(75) Inventor: Yuji Hasegawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/655,174

(22) Filed: Sep. 3, 2003

(30) Foreign Application Priority Data

Sep. 5, 2002 (JP) ........................................ 2002-260381

(51) Int. Cl.[7] ................................................ G08G 1/16
(52) U.S. Cl. ........................... 701/301; 342/29; 342/70; 340/436; 340/902; 348/148; 348/152; 382/104
(58) Field of Search .............................. 348/119, 416.1, 348/148, 152, 143; 382/124, 218, 154, 165, 104, 209; 340/467, 531, 902, 903, 435, 436, 444, 441, 425.5, 934, 937, 465; 180/170, 282; 701/301, 96; 342/29, 357.07

(56) References Cited

U.S. PATENT DOCUMENTS

2001/0040505 A1 * 11/2001 Ishida et al. ................ 340/435
2002/0101364 A1 * 8/2002 Lin ............................. 340/988
2003/0080878 A1 * 5/2003 Kirmuss ...................... 340/936
2003/0201875 A1 * 10/2003 Kuo ......................... 340/426.18

FOREIGN PATENT DOCUMENTS

| JP | 06-214014 | 8/1994 |
|----|-----------|--------|
| JP | 06-247246 | 9/1994 |
| JP | 2001-101592 | 4/2001 |

* cited by examiner

Primary Examiner—Thomas C. Black
Assistant Examiner—Tuan C To
(74) Attorney, Agent, or Firm—Fenwick & West LLP (57) ABSTRACT

A vehicle control system captures an external image from the primary vehicle and stores templates for detecting the approach of the another vehicle in order to perform a collision avoidance action. A template is updated when a brake pedal is pressed by a driver, and the external image is compared with the template to determine, based upon the result of the comparison, whether the other vehicle is approaching the primary vehicle. The system instructs the primary vehicle to perform the collision avoidance action when the comparison exceeds a threshold value. When an image similar to the template is captured and the driver does not perform a collision avoidance action such as releasing an accelerator or pressing a brake pedal, throttle valve is forcibly closed to inhibit accelerator of control, and braking force is provided even if harsh braking is performed by the driver.

24 Claims, 10 Drawing Sheets

VEHICLE CONTROL SYSTEM, PROGRAM AND METHOD

TECHNICAL FIELD

The present invention relates to a vehicle control system, program and method for detecting the approach of another vehicle based on images captured by a camera mounted on a primary vehicle and instructing the primary vehicle to take some action depending on detection result.

BACKGROUND OF THE INVENTION

Conventionally, a sensor or a camera mounted on an automobile is used to detect an approaching vehicle based on its output. In most cases, presence/absence of the approaching vehicle is detected by pattern matching between features extracted from captured images and templates prepared in advance. For example, Japanese Patent No.3014233 discloses an approaching object detecting apparatus. According to the apparatus, a captured image is divided into a plurality of window regions. A pattern corresponding to the image is created with features extracted from each window region as a data array. By comparing the pattern with the captured image, the approaching object apparatus may be detected automatically and reliably.

Various methods may be used to extract features from the captured image. Among those, many methods use optical flows. For example, Japanese Patent No.3011566 discloses an approaching vehicle monitoring apparatus. According to the apparatus, optical flows are computed based on captured images. By detecting a moving object and its movement direction through the use of the optical flows, only approaching vehicle may be detected separately from its background. Since optical flows are used to eliminate noise according to this invention, more accurate detection may be realized.

There are some techniques for not only detecting the approaching vehicle by image processing but controlling the vehicle by utilizing the result of the image processing. For example, Japanese Unexamined Patent Publication (Kokai) No.2001-101592 discloses a vehicle collision prevention apparatus. By detecting conditions of an intersection before entering it, the apparatus takes an appropriate action to avoid collision. If it is determined that collision avoidance action is necessary, the apparatus instructs the vehicle to make a braking or temporarily prohibit the driver's pressing of an accelerator pedal.

In order to detect the approach of another vehicle based on an image, pattern matching is necessary between the image and templates. However, if the templates should be prepared in advance, a large number of templates are required to make an appropriate vehicle control in many different situations. This may cause a problem of storage capacity.

There may be much difference between scenes on which the driver determines that collision avoidance action is needed depending on some information such as road conditions, weather and the driver's personal character. Therefore, if the number of templates for determination is limited, flexibility is lost and collision avoidance action can be made in inappropriate condition, which makes a bad effect on driving.

Therefore, there is a need for vehicle control system which is flexibly applicable to driver's characteristics and various situations around the primary vehicle with relatively small storage capacity.

SUMMARY OF THE INVENTION

According to the present invention, every time a driver presses a brake pedal, an image captured in a traveling direction of a primary vehicle is reflected to a template. When an image similar to the template is captured and the driver does not perform a collision avoidance action such as releasing an accelerator and pressing a brake pedal, a brake system throttle valve is forcibly closed. Thus, the accelerator becomes out of control and sufficient braking force is provided even if harsh braking is performed by the driver.

One aspect of the invention provides a vehicle control system for detecting the approach of another vehicle to the vehicle mounting the control system (hereinafter referred to as a "primary vehicle") to execute a collision avoidance action. The vehicle control system comprises capturing means for capturing an external image from the primary vehicle and template memory means for storing templates for detecting the approach of another vehicle. The system further comprises template update means for updating the templates when a brake pedal is pressed by a driver and recognizing means for comparing the external image with the template and calculating an evaluation value to determine whether the another vehicle approaches the primary vehicle based on the result of said comparing. The system further comprises instruction means for instructing the primary vehicle to perform the collision avoidance action when said evaluation value exceeds a threshold value.

According to such aspect of the invention, based on the image captured in the traveling direction of the primary vehicle, the control system determines whether it is necessary to decelerate or stop the primary vehicle because of short distance between vehicles by comparing the evaluation value with a threshold value. Then, when it is determined that the primary vehicle needs to be decelerated or stopped and when the driver does not perform the collision avoidance action such as releasing an accelerator or pressing a brake pedal, a control signal for instructing the primary vehicle to perform the collision avoidance action is sent to the primary vehicle. As a result, collision between vehicles may be prevented. The number of threshold values ("$k_1$" in a preferred embodiment) is not limited to one. The type of collision avoidance action may be changed depending on which threshold value the evaluation value exceeds. Note that the collision avoidance action includes forcibly closing a throttle valve of a brake system. Thus, the vehicle driving force is decreased and a sufficient negative pressure is provided to a brake booster. As a result, even when the driver's judgment is delayed and harsh braking is required, sufficient braking force may be provided to the vehicle. The collision avoidance action includes making an alarm or a warning display for the driver, forcibly releasing an accelerator pedal and forcibly pressing a brake pedal.

The template is composed of a plurality of sub-regions and each sub-region has an eigen value. The eigen values should be, but not exclusively, pixel intensity values in 256-level gray scale. The values may be calculated by applying a Fourier transform, a Gabor transform or a wavelet transform.

The recognizing means calculates the evaluation value according to the following procedure. The captured image and the template are compared for each sub-region to calculate a similarity factor of each sub-region. Optical flows are calculated based on the image. The similarity factor and the optical flows are multiplied to calculate a feature value of each sub-region. Then, by adding all of the feature values and weights assigned to sub-regions, the evaluation value is calculated. The feature value is, for example, a local movement $V_n$ in the preferred embodiment described below. Further, the similarity factor is calculated by comparing an arithmetic mean value of the pixel intensity values contained in each sub-region with the eigen value of each sub-region.

When the brake pedal is pressed by the driver, the template update means increases the weight of the sub-region containing approach information of another vehicle (see the process performed on a weighting value $W_n$ at steps S308, S312 in the preferred embodiment). The template update means operates to bring the eigen value of a given sub-region closer to the value for the corresponding sub-region in the image (see the process at steps S308, 312 in the preferred embodiment). Thus, the conditions under which the driver judges the need for braking may be stored as templates and personal character of the driver and traffic conditions are reflected on the determination of the approach of the vehicle.

Preferably, templates are stored in a template memory means as a template set. The template set is composed of templates with a positive weight and templates with a negative weight. The template set is not limited to one set. Three types of template (that is, for traveling straight, turning left and turning right) may be prepared depending on traveling direction of the primary vehicle. In such a case, the template update means updates the template in the template set corresponding to the traveling direction of the primary vehicle. The recognizing means calculates the evaluation value with respect to the template in the template set corresponding to the traveling direction of the primary vehicle. Thus, since templates are updated every time the brake pedal is pressed by the driver instead of preparing the large number of fixed templates, storage capacity for templates may be relatively small.

DETAILED DESCRIPTION OF THE PREFERRED EMBODIMENTS

Figure 1:
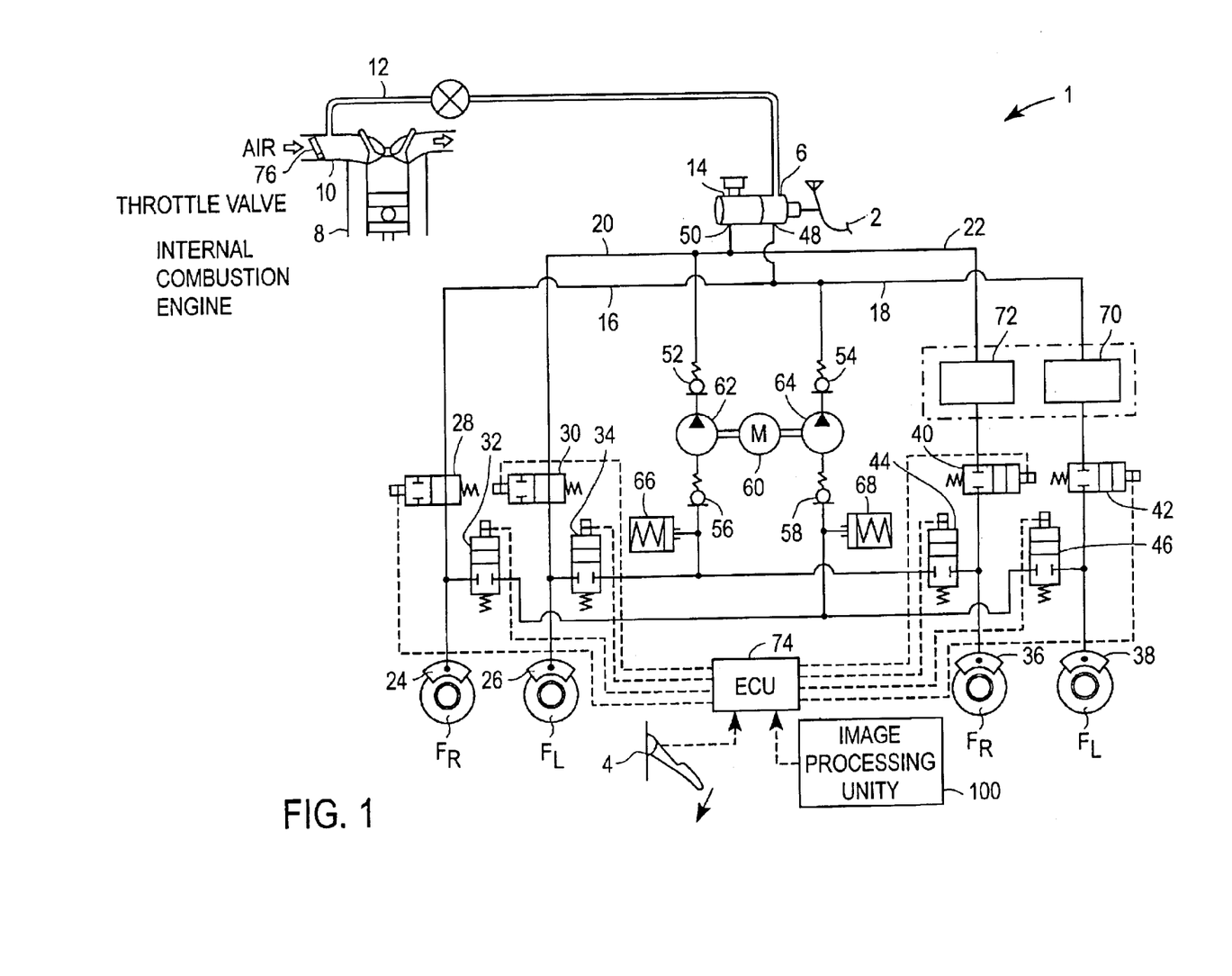
FIG. 1 is a diagram of a brake system, which is an object to be controlled by a vehicle control system of the invention.

FIG. 1 shows an example of a brake system 1 being controlled by a vehicle control system according to the invention. The brake system 1 comprises a brake pedal 2 and an accelerator 4 provided in a cabin of a vehicle. A sensor is provided to each of these pedals for detecting whether the pedal is being pressed. The brake pedal 2 is connected to a brake booster 6. A negative pressure generated inside an intake manifold 10 of an internal combustion engine 8 is supplied to the brake booster 6 via a pressure conducting pipe 12. Using the negative pressure, the brake booster 6 generates assisting force according to the pedaling force of the brake pedal 2.

A master cylinder 14 connected to the brake booster 6 generates master cylinder pressure $P_m$ depending on the sum of the brake pedaling force and the brake assisting force of the brake booster 6. The master cylinder pressure $P_m$ is conducted to hydraulic systems 16, 18, 20, 22 provided corresponding to four tires FR, FL, RR, RL, where braking power is produced to each tire.

Wheel cylinders 24, 26 providing braking power to the tires FR and FL are connected to normally opened solenoid valves 28, 30 and normally closed solenoid valves 32, 34, respectively. Wheel cylinders 36, 38 providing braking power to the tires RR and RL are connected to normally opened solenoid valves 40, 42 and normally closed solenoid valves 44, 46, respectively.

The master cylinder 14 is of a tandem type and includes an output port 48 connecting to the hydraulic systems 16, 18 and an output port 50 connecting to the hydraulic systems 20, 22.

The brake system 1 further includes emission valves 52, 54, intake valves 56, 58, a motor 60, pumps 62, 64, auxiliary reservoirs 66, 68, and proportional pressure reducing valves 70, 72. The proportional pressure reducing valves 70, 72 are equipped for balancing the brake control by proportionally reducing the braking power applied to the rear wheels (tires RR, RL) relative to the front wheels (tires FR, FL) according to reduction amount of rear wheel load on braking.

The normally open solenoid valves 28, 30, 40, 42, the normally closed solenoid valves 32, 34, 44, 46, the motor 60 and the proportional pressure reducing valves 70, 72 are controlled by an electronic control unit (ECU) 74.

When the brake pedal is pressed by a driver, the normally opened solenoid valves 28, 30, 40, 42 are opened, the normally closed solenoid valves 32, 34, 44, 46 are closed and the pumps 62, 64 are stopped in response to a signal from the ECU 74. As a result, the master cylinder 14 and the wheel cylinders 24, 26, 36, 38 become connected. The master cylinder pressure $P_m$ is supplied to the wheel cylinders 24, 26, 36, 38 and thus the braking force corresponding to the driver's pedaling force is generated.

During antilock control, the pumps 62, 64 become connected in response to a signal from the ECU 74. The normally opened solenoid valves 28, 30, 40, 42 and the normally closed solenoid valves 32, 34, 44, 46 are closed or opened as required. Accordingly, the pressure in the wheel cylinders 24, 26, 36, 38 is increased, decreased, or maintained as required. For example, when it is detected that the tire FR is about to be locked up unnecessarily, the normally opened solenoid valve 28 is energized to be closed and the normally closed solenoid valve 32 is energized to be opened. As a result, some of the brake fluid pressure in the hydraulic system 16 flows into the auxiliary reservoir 68 and so the braking force on the tire FR is reduced. The fluid stored in the auxiliary reservoir 68 is returned back to the hydraulic system 16 by the pump 64.

Depending on depression of the accelerator pedal 4, the ECU 74 controls opening of a throttle valve 76 of the internal combustion engine 8 over a range from totally closed to full throttle. As the degree of opening of the throttle valve 76 increases, rotation speed of the internal combustion engine 8 increases, thereby increasing the driving force of the primary vehicle.

The greater the opening degree of the throttle valve 76 is, less negative pressure is generated in the intake manifold 10. Therefore, the negative pressure supplied from the pressure conductor 12 to the brake booster 6 is decreased. As a result, the assisting limit pressure from the brake booster 6 is reduced. When harsh braking is performed while the assisting limit pressure is reduced, the master cylinder pressure $P_m$ exceeds the assisting limit pressure and vehicle braking force corresponding to the pedal pressing force may be varied compared to normal braking situation.

One objective of the invention is to generate sufficient vehicle braking force even when harsh braking occurs. The vehicle control system according to one embodiment of the invention determines whether the primary vehicle needs to be decelerated or stopped based on the image captured in the traveling direction when the distance between vehicles becomes short. When the primary vehicle needs to be decelerated or stopped and the driver fails to perform a collision avoidance action such as releasing the accelerator or pressing the brake pedal, the vehicle control system controls the throttle valve 76 of the brake system 1 to be closed. Thus, the vehicle driving force decreases and sufficient negative pressure is supplied to the brake booster 6. Therefore, even when harsh braking is required because of the delay of driver's judgment, sufficient braking force may be generated.

Figure 2:
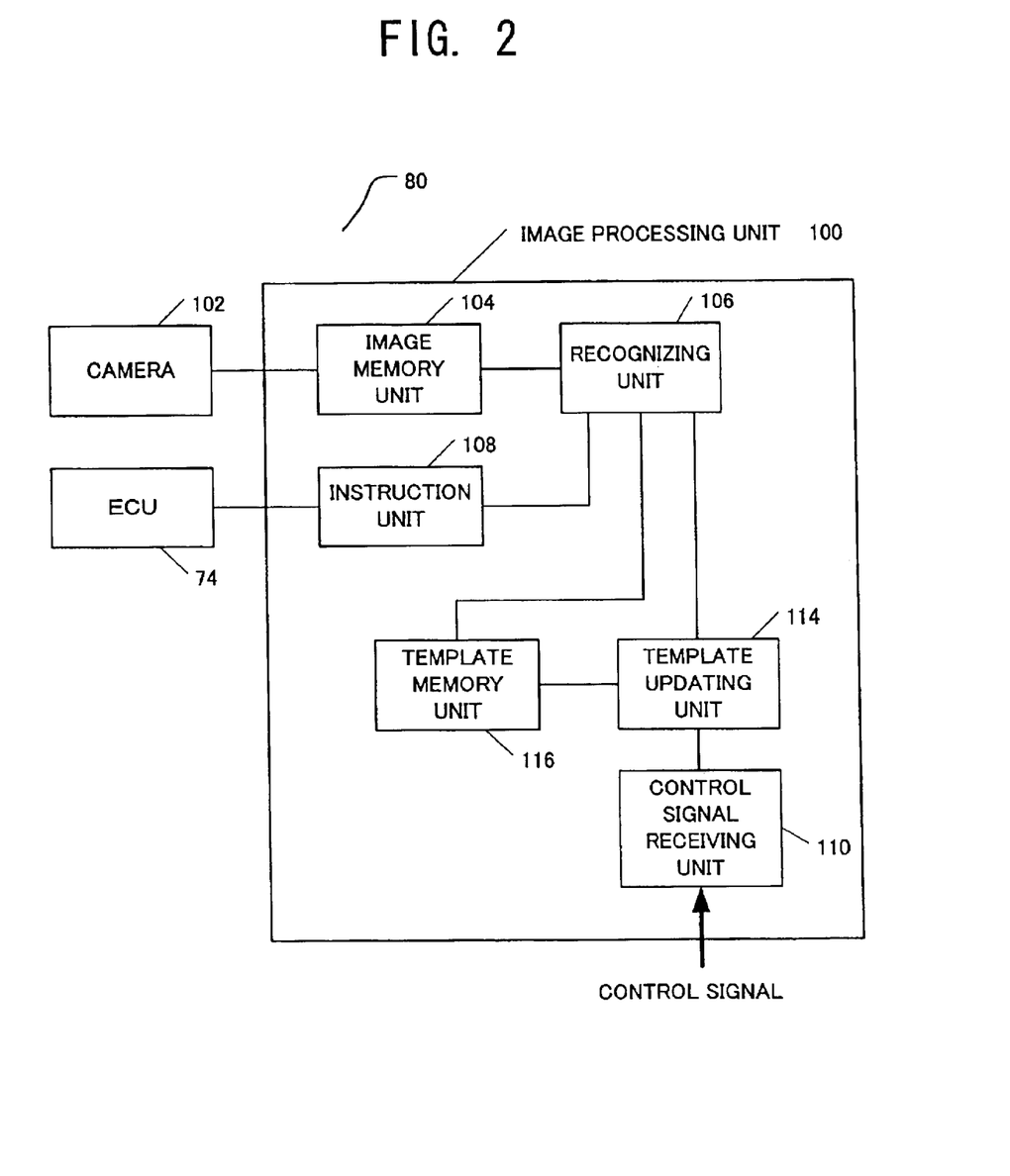
FIG. 2 is a functional block diagram of the vehicle control system.

FIG. 2 is a functional block diagram of the vehicle control system 80 according to one embodiment of the invention. The vehicle control system 80 includes a camera 102 for capturing an image, an image processing unit 100 for determining the need of a control instruction for the primary vehicle based on the image, and the ECU 74 for sending control signals to some parts of the brake system 1 according to the control instruction.

Figure 3:
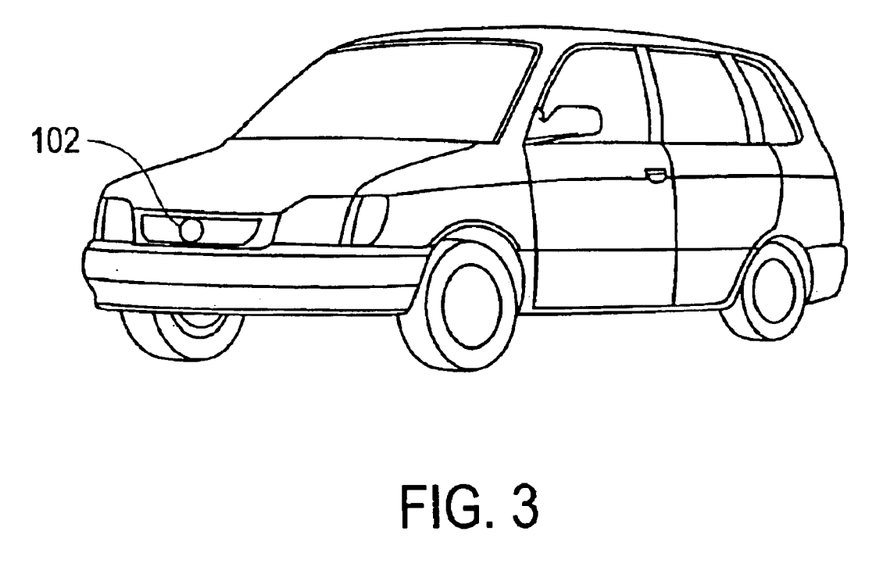
FIG. 3 is a diagram showing an example of a position where a camera is installed in a vehicle.

The camera 102 (for example, a CCD camera) is mounted at the front of the primary vehicle and captures images in the vehicle traveling direction at regular intervals. Captured images are sequentially transmitted to the image processing unit 100. FIG. 3 shows an example of mounting position of the camera 102. The camera 102 may be installed in other positions. Two or more cameras may be used. The image is a digital image having pixels with intensity values providing 256-level (from 0 to 255) gray scale. Alternatively, an image with pixels providing greater or less level gray scale may be used.

The image processing unit 100 includes an image memory section 104, a recognizing section 106, an instruction section 108, a control signal receiving section 110, a template update section 114, and a template memory section 116. These functional blocks of the image processing section 100 may be implemented in software or hardware. The image processing section 100 may be implemented as some part of the ECU 74.

The image memory section 104 stores some sequential images received from the camera 102. For example, the section 104 stores two sequential images.

The recognizing section 106 determines to send control signals to the ECU 74 based on the images stored in the image memory section 104. Specifically, the recognizing section 106 processes the images stored in the image memory section 104 and a template Mn stored in the template memory section 116 (detailed process will be described later) to recognizes situation in the traveling direction of the primary vehicle. When the vehicle moves forward, the section 106 determines whether another vehicle traveling ahead approaches the primary vehicle. If so, the section 106 further determines whether some control is needed on the brake system 1. Determination result is sent to the instruction section 108.

The instruction section 108 sends appropriate control instruction to the ECU 74 according to the determination result of the recognizing section 106. The ECU 74 then executes some control such as closing the throttle valve 76.

In the template memory section 116, templates are stored for matching with images. Assume that the number of stored templates is represented as "n" (n=1, 2 . . . ) and each template is indicated as $M_n$.

Figure 4:
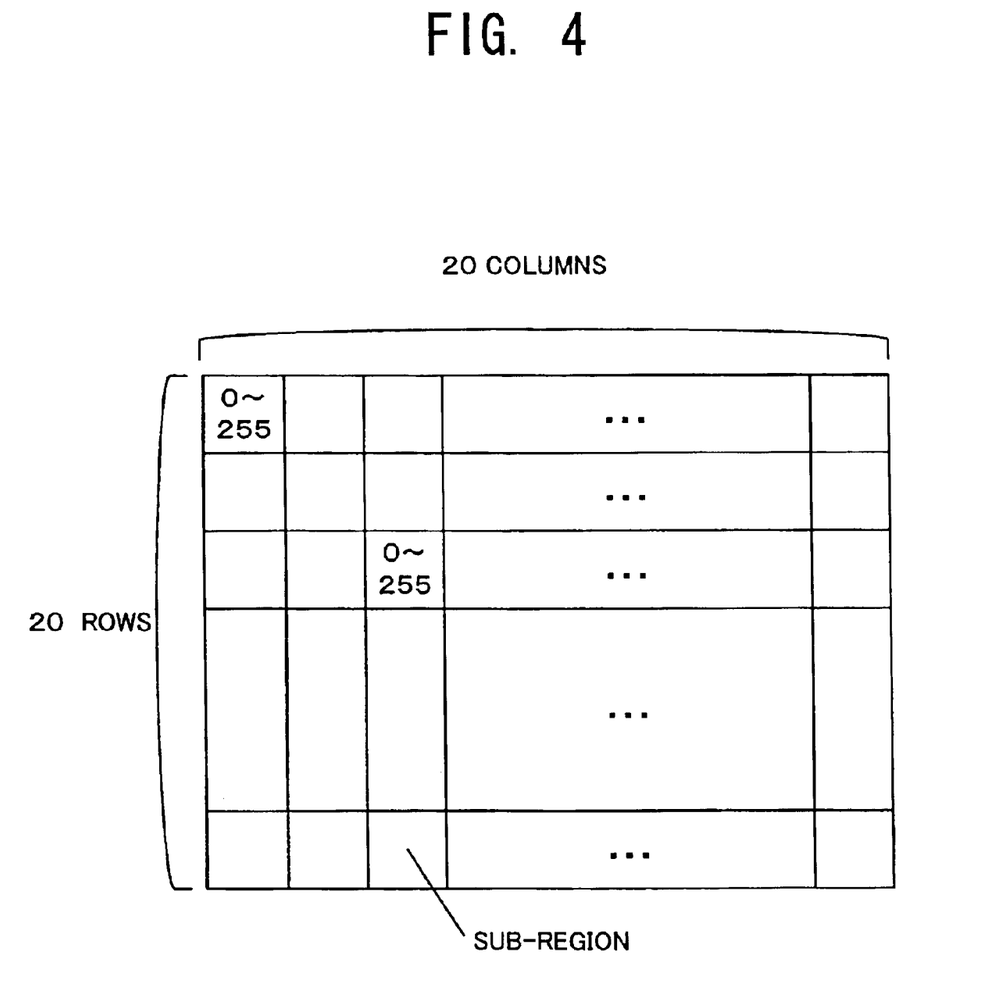
FIG. 4 is a diagram showing a construction of a template.

FIG. 4 shows one example of template layout. One template includes 400 sub-regions in 20 columns by 20 rows. Each sub-region in the template corresponds to pixels in a sub-region having same size in the captured image. Each sub-region has one eigen value. In this embodiment, the pixel intensity value is used as the eigen value. This eigen value is updated based on the image captured by the camera 102 every time the driver presses the brake pedal. Specifically, the image is divided into 400 sub-regions each having the same size as that of the template. A value calculated by making an appropriate correction on arithmetic mean of the intensity values of the pixels included in each sub-region is set as the intensity value of each sub-region. Thus, one of 256-level gray scale intensity values (0 to 255) is assigned to each sub-region. An initial value for the intensity value is assigned randomly. It should be noted that the number of sub-regions in one template is not limited to 400. The number of the sub-regions is chosen to enable optimal control of the primary vehicle depending on various factors such as processing ability of the ECU 74, resolution of the camera 102, and size and number of the templates.

Figure 5:
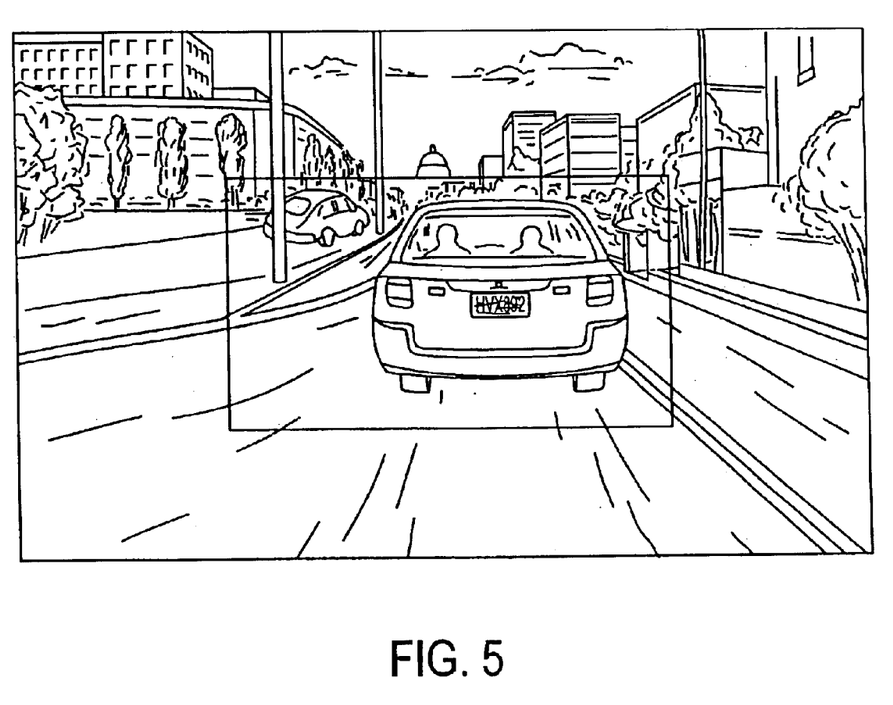
FIG. 5 is an example of an image captured by the camera.
Figure 6:
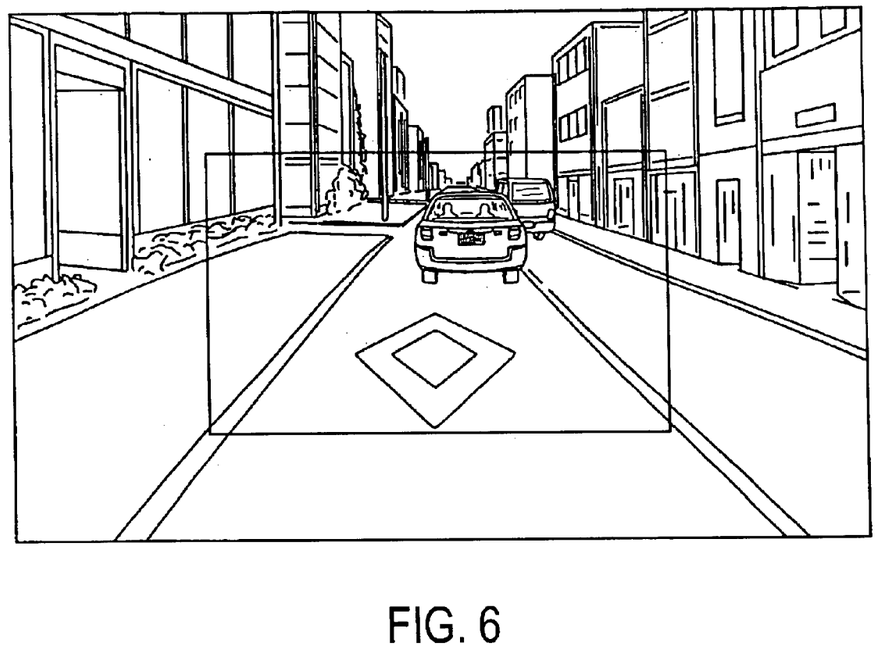
FIG. 6 is another example of the image captured by the camera.

In order to recognize the approach of a front vehicle accurately, the template is positioned at the center of the captured image. FIGS. 5 and 6 show location of a template (indicated by a rectangular black frame) in regard to an image captured by the camera 102.

The size of a template may be same as that of the captured image. Preferably, the size of the template relative to the image is determined by experiments in consideration of various factors such as resolution of the camera 102, processing ability of the ECU 74, number of templates and total number of sub-regions.

When the size of a template is too large relative to the image, the template becomes prone to be influenced by images specific to each road which have no direct relation with the approach of the front vehicle. When the size of a template is too small relative to the image, the template may be filled with only the image of the front vehicle and so the approach of the vehicle cannot be detected accurately. Therefore, the size of template is preferably determined through experiments depending on various factors such as processing ability of the ECU 74, resolution of the camera 102, and size and number of the templates.

Figure 7:
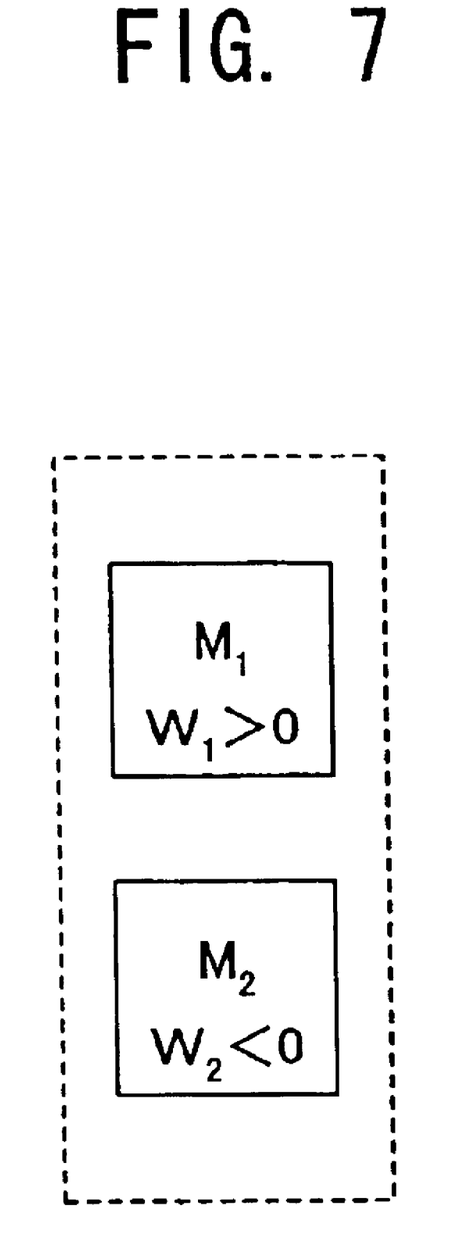
FIG. 7 is a diagram showing a template prepared in advance.

According to the embodiment, two templates (labeled $M_1$, $M_2$) are stored in the template memory section 116 as shown in FIG. 7. Each template is assigned according to optical flows computed based on captured images, which is described later. Preparing a plurality of templates enables more accurate determination. However, only one template or more than two templates may be prepared.

One feature of the present invention is that the templates $M_n$ are not fixed but are updated as needed when the brake pedal is pressed by the driver. When the brake pedal is pressed by the driver while driving the primary vehicle, the control signal is outputted from the sensor provided to the brake pedal to the control signal receiving section 110 in the image processing unit 100. Upon receiving the control signal, the template update section 114 updates corresponding template $M_n$. This template updating process is described later in detail with reference to FIG. 10.

As described above, instead of preparing many fixed templates in advance, a constant number of templates are updated based on braking operation performed according to personal character of the driver or the traffic conditions. Thus the storage capacity for the templates may be reduced. In addition, flexible vehicle control according to driving environment and the like may be realized.

It should be noted that the numeric value corresponding to each sub-region in the template is not restricted to the intensity values providing 256-level gray scale. The numeric value may be represented in more or fewer level. The numeric value may be the value calculated by applying the Fourier transform, the Gabor transform, the Wavelet transform to the intensity value. Any numeric value corresponding to captured image and capable of being matched with the image may be used in the invention.

Now, process of recognizing the approaching vehicle based on the image and outputting the control signal to the primary vehicle is described with reference to the flowchart in FIG. 8. Hereinafter assume that the template memory section 116 has two templates $M_1$ and $M_2$ shown in FIG. 7. Weight $W_1$ or $W_2$ having opposite polarity is assigned to each sub-region of the two templates depending on the direction of optical flows.

Images captured by the camera 102 in the traveling direction of the primary vehicle are sequentially stored in the image memory section 104 (S200). Each pixel in the images are represented in 8-bit (256-level gray scale) intensity values.

The recognizing section 106 compares the latest image stored in the image processing section 104 with all templates $M_n$ in the template memory section 116. Then, the recognizing section 106 calculates a similarity factor $S_n$ for each sub-region in all templates (S202).

Process for calculating the similarity factor $S_n$ is described with reference to FIGS. 8 and 9. The recognizing section 106 calculates arithmetic mean of the pixel intensity values within a region corresponding to each sub-region of a first template $M_1$ for the latest image stored in the image processing section 104 to calculate 400 intensity values having same array with the template. Assume that an intensity value of a sub-region in template $M_n$ is $M_n(x,y)$. Intensity value after the process in the image captured at time t is represented as $I_t(x,y)$. The coordinates (x,y) indicate the position of a sub-region in the template. For example, coordinates of a sub-region at the bottom-left corner in the template in FIG. 4 is represented as (1,1), and coordinates of a sub-region at the top-right corner in the template is represented as (20,20).

The pixel intensity values of the image calculated as described above and the intensity value $M_1(x,y)$ of the template $M_1$ are compared for each sub-region. When the difference between them is smaller than a predetermined value, the intensity value of the sub-region is considered to be similar to the intensity value of the image. When the difference between them is greater than the predetermined value, the intensity value of the sub-region is considered not to be similar to the intensity value of the image.

The above-mentioned process may be represented in the following equations. The difference $D_n(x,y)$ is represented as:

$$D_n(x, y)=|M_n(x, y)-I_t(x, y)| \tag{1}$$

By comparing the difference $D_n(x,y)$ and the predetermined threshold value $G_n$, the similarity factor $S_n$ may be determined according to the following equation.

$$S_n(x, y) = \begin{cases} 1 & (D_n(x, y) \le G_n) \\ 0 & (D_n(x, y) > G_n) \end{cases}$$

The threshold value $G_n$ is determined in advance from some experiments for investigating association between brake timing by the driver and the image at that time, so that the accurate vehicle control may be implemented.

The calculated similarity factor $S_n(x,y)$ has same array with that of the template. FIG. 9 is one example of the similarity factor $S_n(x,y)$. Based on the similarity factor, the degree of similarity between the image and the template may be determined.

Next, the recognizing section 106 uses the latest image $I_t(x,y)$ and the image $I_{t-1}(x,y)$ captured immediately before to calculate optical flows in each sub-region (S204). As is well known, optical flows $(v_x(x,y), v_y(x,y))$ may be calculated from the following equation.

$$\partial x v_x(x,y)+\partial y v_y(x,y)+\partial t=0 \tag{2}$$

(x,y) are coordinates designating each sub-region within the array as described above. Since the primary vehicle using the vehicle control system 80 normally travels forward/backward or turn left/right, optical flows in y direction (vertical direction) is much smaller than that in x direction (horizontal direction). Therefore, only x component $v_x(x,y)$ is calculated with the equation (2) in order to reduce computing load in this embodiment.

Based on the similarity factor $S_n(x,y)$ and the optical flow $v_x(x,y)$, the recognizing section 106 calculates local movement $V_n(x,y)$ in each sub-region according to the following equation (S206).

$$V_n(x,y)=S_n(x,y) \cdot v_x(x,y) \tag{3}$$

Figure 9:
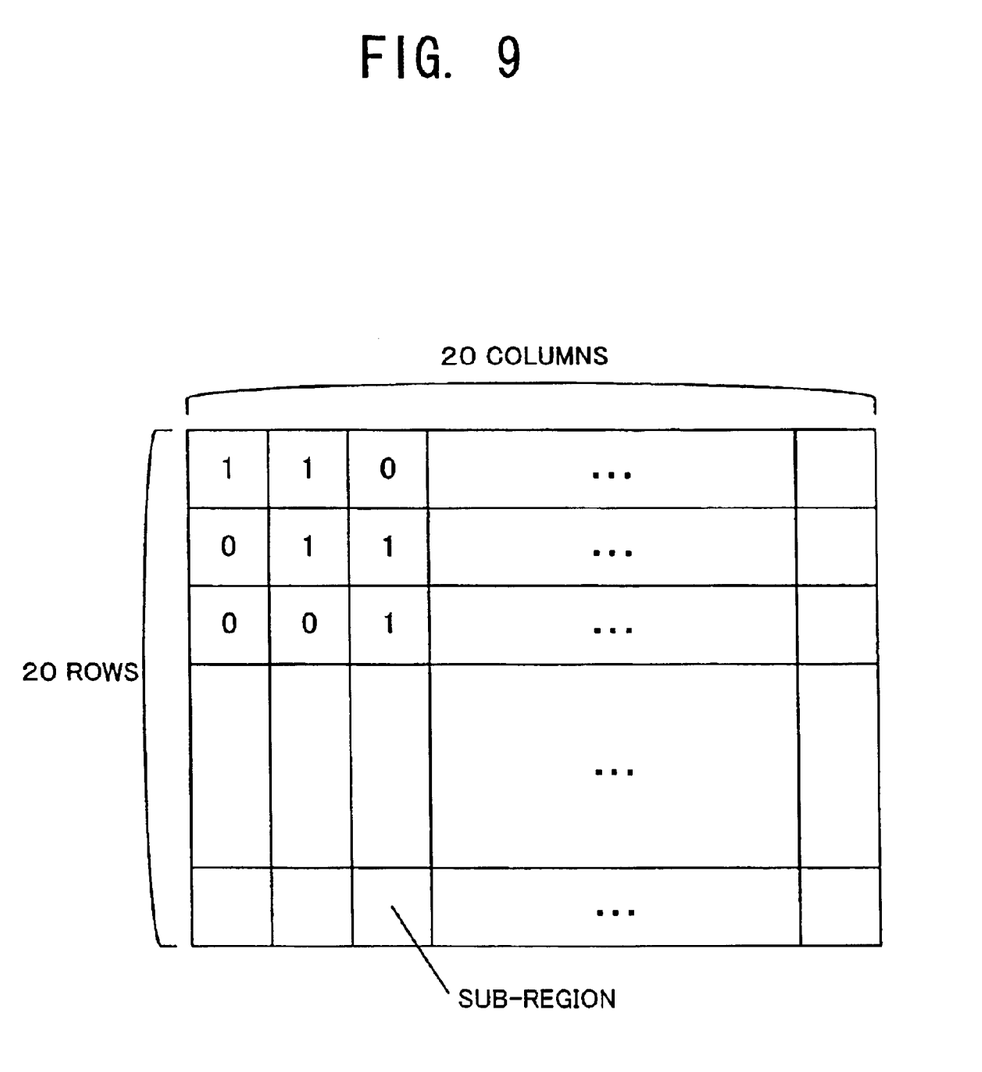
FIG. 9 is a diagram showing similarity factors assigned to each sub-region of the template.

The local movement $V_n(x,y)$ reflects the value of the optical flows of the sub-region having similarity factor $S_n(X,Y)$ in FIG. 9. It should be noted that the local movement $V_n(x,y)$ includes directional information for the direction of the optical flows in each sub-region.

Processes from step S200 to step S206 is also performed on all sub-regions within the second template $M_2$.

Figure 10:
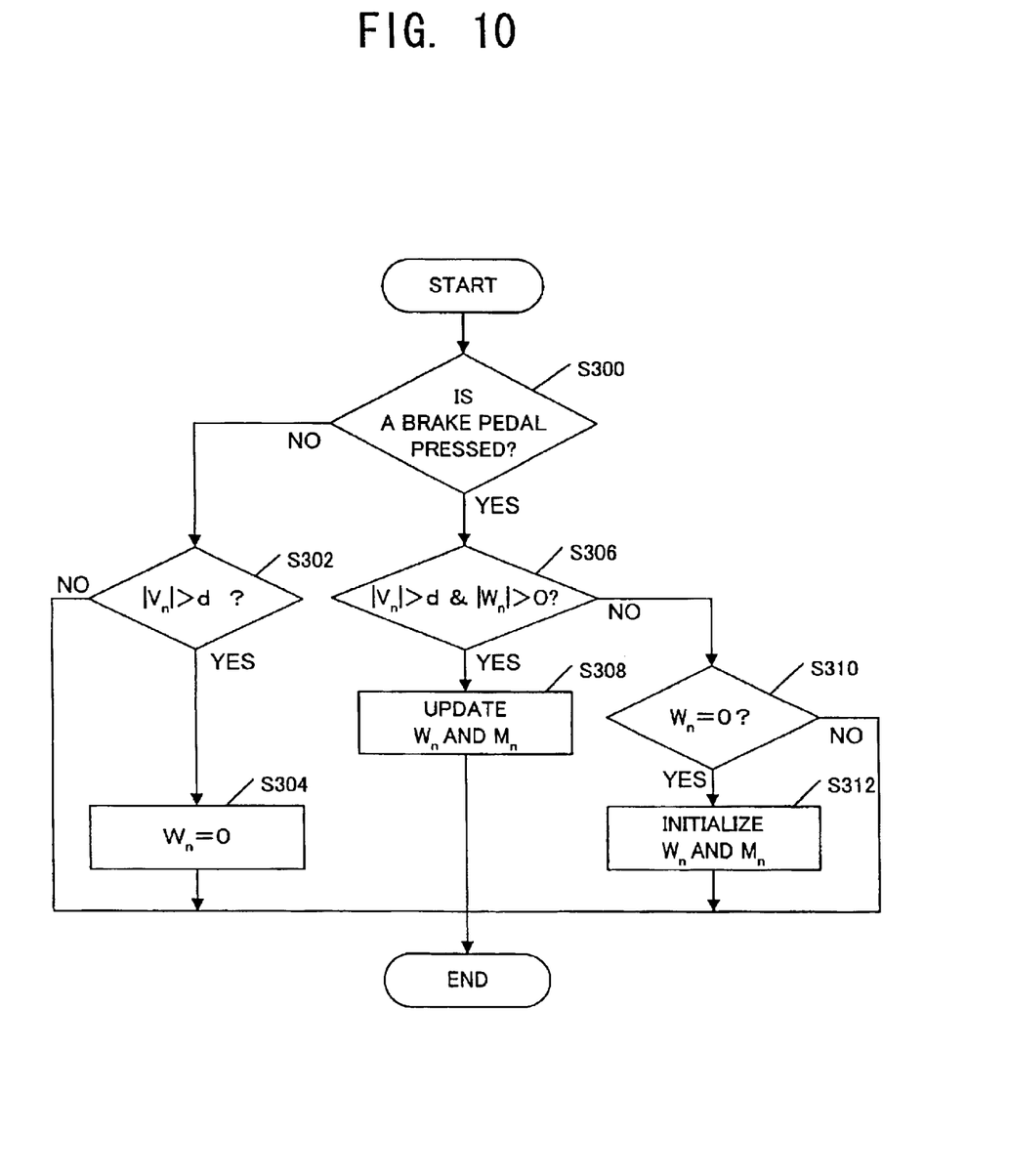
FIG. 10 is a flowchart of template updating process performed by the image processing unit.

The recognizing section 106 then calculates an evaluation value B by the following equation.

$$B = \sum_n \alpha_n \sum_x \sum_y W_n(x, y) V_n(x, y) \tag{4}$$

where $W_n(x,y)$ represents a weight for each sub-region. As shown in FIG. 7, a positive weight $W_2$ is assigned to each sub-region in the template $M_1$ and a negative weight $W_2$ is assigned to each sub-region in the template $M_2$. Therefore, assuming that the leftward direction in the templates is "positive" and the rightward direction in the templates is "negative", the larger the local movement $V_n(x,y)$ in the leftward direction in the template $M_1$ is, and also the larger the local movement $V_n(x,y)$ in the rightward direction of the template $M_2$ is, the larger the evaluation value B becomes. $\alpha_n$ represents a template coefficient for each template $M_n$ and $0<\alpha_n \le 1$. "n" is a total number of templates being stored and set to n=2, for example. Weight $W_n(x,y)$ is updated as needed when the brake pedal is pressed by the driver. This process will be described later with reference to FIG. 10. The template coefficient an is pre determined for each template by experiments or so in order to perform the vehicle control accurately.

Typically, the closer the vehicle ahead approaches to the primary vehicle, the greater the optical flow $v_x(x,y)$ becomes. The evaluation value B is calculated by using the weight $W_n(x,y)$ to strengthen the local movement $V_n(x,y)$, and further by adding this with respect to all the templates. Therefore, the more sub-regions have similarity factor $S_n(x,y)=1$, the larger the optical flow $v_x(x,y)$ becomes, the larger the weight $W_n(x,y)$ becomes, and the greater the evaluation value B becomes. In other words, the more similar the captured image is to the image previously captured when the brake pedal is pressed, the greater the evaluation value B becomes. The evaluation value B becomes larger when the approaching speed to the front vehicle is faster.

The recognizing section 106 determines whether the evaluation value B calculated by equation (4) is greater than a predetermined threshold value $k_1$ (S210). When the evaluation value B is smaller than the threshold value $k_1$, this routine is finished. When the evaluation value B is greater than the threshold value $k_1$, the recognizing section 106 concludes that collision avoidance action (for example, braking) is required. Then, the recognizing section 106 determines whether the driver actually takes the collision avoidance action based on presence/absence of a signal from the sensor installed to the brake pedal or accelerator 4 (S212). When the driver takes the collision avoidance action, this routine is finished. When the driver does not take the collision avoidance action, the instruction section 108 sends control instruction to the ECU 74 (S212). In response to the control instruction, the ECU 74 executes some operation such as closing the throttle valve 76. Thus, since the driving force of the primary vehicle decreases and sufficient negative pressure is supplied to the brake booster 6, sufficient braking force is provided surely under harsh braking, leading to improve safety of the primary vehicle. Simultaneously with or instead of the close of the throttle valve 76, an alarm or warning display may be generated on the vehicle. Alternatively, after determining as "NO" at step S212, the control instruction on step S214 may be send with some delay depending on the approaching speed to the front vehicle.

In comparing step of the evaluation value B at S210, when the threshold value $k_1$ is set at too low value, the throttle valve 76 is closed at early timing. This may result in decreasing the driving force of the primary vehicle unnecessarily. When the threshold value $k_1$ is set at too high, the vehicle may not be decelerated in case of necessity. Therefore, the threshold value $k_1$ should be set at appropriate value considering various parameters such as the environment surrounding the primary vehicle, velocity of the primary vehicle, computing performance of the image processing unit 100 and layout and number of templates $M_n$.

According to another embodiment, the recognizing section 106 has a plurality of threshold values (for example, $k_1$, $k_2$ and $k_3$) for comparing step at S210 and executes a different vehicle control depending on which threshold value the evaluation value B exceeds. For example, when the evaluation value B exceeds threshold value $k_1$, the throttle valve 76 is controlled to be closed. When the evaluation value B exceeds $k_2$ ($>k_1$), an alarm or warning display is issued to the driver. When the evaluation value B exceeds $k_3$ ($>k_2$), a braking pedal is pressed forcibly.

Figure 8:
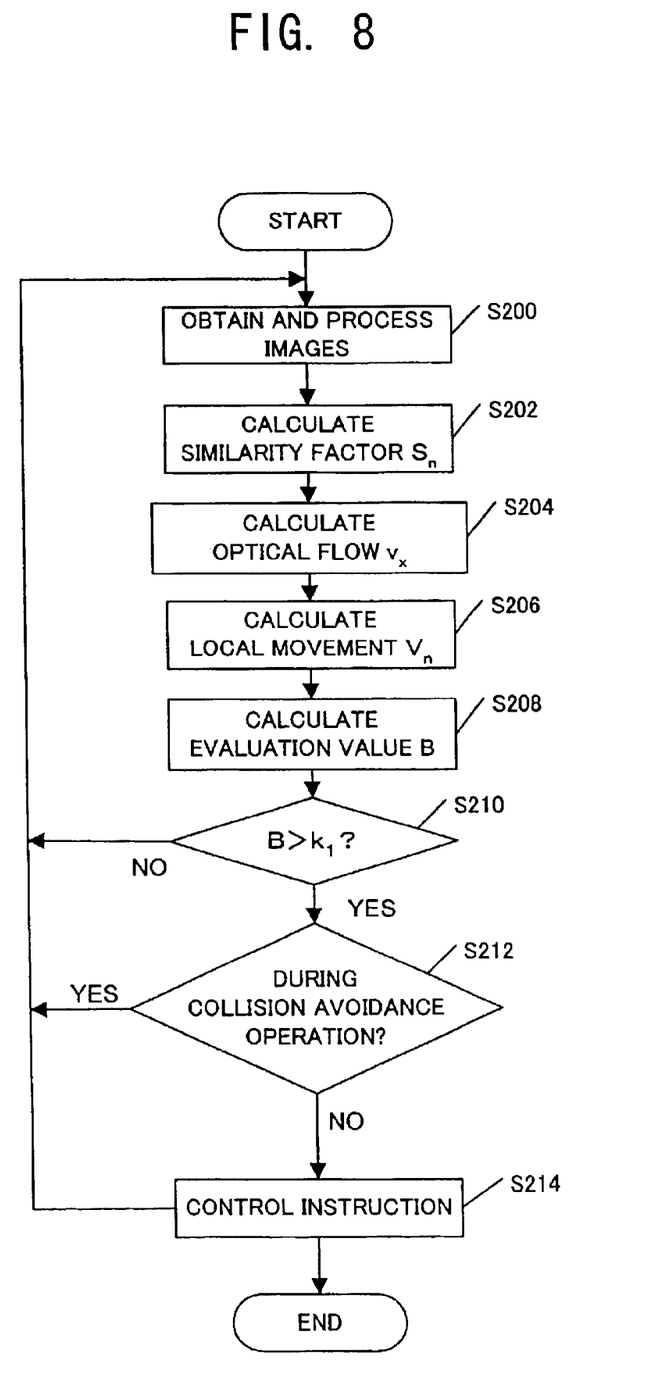
FIG. 8 is a flowchart of vehicle approach recognizing process performed by an image processing unit.

According to further another embodiment, instead of providing step S212 in FIG. 8, a control instruction may be issued when $B>k_1$ at step S210 regardless of the presence or absence of the collision avoidance action.

The number of templates is not restricted at two in the process in FIG. 8. For example, since there are some differences in the optical flows according to the type of movements (traveling straight traveling, turning right or left), different template set (shown in FIG. 7) may be prepared for each type of movement. In this case, appropriate template set is selected based on the angle of a steering wheel.

Alternatively, various template sets may be prepared depending on the type of a front vehicle (large or small, etc.) or its road surroundings. In this case, appropriate template set is selected depending on the front vehicle and the surroundings. For example, three template sets, one for freeways, one for urban areas and one for mountain roads, may be prepared. Depending on the current road surroundings provided by a car navigation system, an appropriate template set may be selected for use in the process in FIG. 8.

With reference to FIG. 10, updating process for intensity value $M_n(x,y)$ and weight $W_n(x,y)$ in each sub-region of the template $M_n$ is described. This process is performed on all sub-regions (for example, 400 sub-regions) in all templates (for example, two templates) every time the driver press the brake pedal.

The control signal receiving section 110 determines whether the brake pedal is pressed by the driver based on the signal from the sensor provided to the brake pedal 2 (S300).

When the brake pedal is not pressed, the template update section 114 then determines whether an absolute value $|V_n(x,y)|$ of the current local movement is greater than a predetermined threshold value "d" (S 302). If $|V_n(x,y)| \leq d$, this routine is finished because it is unnecessary to update the pixel intensity value and the weight $W_n$ for the sub-region in the template.

If $|V_n(x,y)|>d$, it is considered that the local movement $V_n(x,y)$ of the sub-region is increased even though the brake pedal is not pressed. In this case, the template update section 114 judges that unnecessary information for judging approach of the vehicle is reflected in the image and then sets the weight $W_n(x,y)$ of that sub-region to zero (S304). By this process, information related to the sub-region having the local movement $V_n(x,y)$ greater than the threshold value "d" is canceled.

When the brake pedal is pressed at step S300, the template update section 114 determines whether $|V_n(x,y)|>d$ and $|W_n(x,y)|>0$ is established (S306). When these conditions are established, the sub-region is considered to include the necessary information for detecting the approach of the front vehicle. Therefore, the template update section 114 updates the intensity value $M_n(x,y)$ and the weight $W_n(x,y)$ for the sub-region (S308).

The intensity value $M_n(x,y)$ and the weight $W_n(x,y)$ are updated by the following equations:

$$M_n(x,y)=M_n(x,y)-q(M_n(x,y)-I_t(x,y)) \quad (5)$$

$$W_n(x,y)=W_n(x,y)+w \quad (6)$$

where "q" is a fixed value within the range of $0<q \leq 1$, and "w" is an initial value of the weight $W_n(x,y)$. "w" in the equation (6) is a negative value for template $M_2$. By using these equations (5) and (6), the information related to the approach of the vehicle is emphasized. among the information included in the template.

When $|V_n(x,y)|>d$ and $|W_n(x,y)|>0$ are not established at step S306, the template update section 114 determines whether the weight $W_n(x,y)$ equals to zero (S310). When $W_n(x,y)$ is not zero, this routine is finished. When $W_n(x,y)$ is zero, the template update section 114 then sets the intensity value of the corresponding inputted image $I_t$ as the intensity value of the template $M_n$ of the sub-region and assigns the initial value "w" to the weight $W_n(x,y)$ (S312). When the weight $W_n(x,y)$ is still zero regardless of the image which is necessary for detecting the approach of the vehicle ahead has been captured in the traveling direction of the primary vehicle, the intensity value of the corresponding sub-region of the inputted image $I_t$ is set to the sub-region because it is judged that this is the first time that the image from that part was obtained.

Now, the process in FIG. 10 is explained in detail with reference to FIGS. 5 and 6. FIGS. 5 and 6 are examples of the images captured by the camera 102 in the traveling direction of the primary vehicle. These images are different in distance between vehicles. Templates, each of which is made from the portion of the image indicated by a rectangular black frame in the captured image, are considered to be different because positional relationship between the vehicle and background is different in these images. Assume that the driver presses the brake pedal when the distance between the vehicles almost equals to the distance shown in the image in FIG. 5. Then, when an image having high similarity level with the template of the image in FIG. 5 is captured, it can be judged that the collision avoidance action should be performed. Then, the template update section 114 updates the templates according to the equations (5) and (6) so that the image captured when the brake pedal is pressed is reflected to a current template. Thus, the templates are updated repeatedly based on the image captured every time the driver presses the brake pedal.

More similar the template is to the image $I_t$ when the brake pedal is pressed, more times the initial value w is added to of the sub-region in the template $M_n$. Thus, absolute value of the weight $W_n(x,y)$ becomes larger. Accordingly, when the braking is repeated many times every time a similar image is captured, sub-regions having the similarity factor $S_n(x,y)=1$ is selected in the image $I_t$ and these sub-regions are enhanced (extracted) by the weight $W_n(x,y)$. On the other hand, information for sub-regions not consistently detected (for example, an object which appears irregularly in front of the primary vehicle) is dropped. Thus, by the process of FIG. 10, selection of information is executed by enhancing information having high reliability (importance) for judging the approach of the front vehicle and deleting other information.

When the brake pedal is kept being pressed, the templates may be updated at the time when the brake pedal is first pressed down. When the brake pedal is pressed more deeply, the templates may be updated one more time.

Note that the threshold value "d", the coefficient "q", and the weighted initial value "w" used in the process in FIG. 10 should be selected appropriately depending on various factors such as computing performance of the ECU 74, resolution of the camera 102, the number of templates or sub-regions so that the template $M_n$ and the weight $W_n$ are updated to detect the approach of the vehicle more precisely. As with the process in FIG. 8, the number of template set in FIG. 10 is not limited to one. A plurality of templates may be prepared corresponding to the direction of movement of the primary vehicle and one template set may be selected for updating depending on the angle of a steering wheel. Alternatively, As with the process in FIG. 8, one template set may be selected for updating among a plurality of template sets depending on the type of a front vehicle and surroundings.

In conclusion, the vehicle control system according to the invention operates as described below. When the primary vehicle is driving, templates are updated to reflect features of an image captured every time a driver presses a brake pedal if some conditions are satisfied. In parallel with this process, the vehicle control system determines whether the primary vehicle needs to be decelerated or halted because another vehicle driving ahead approaches to the primary vehicle based on the image captured in the traveling direction of the primary vehicle. Then, when the primary vehicle needs to be decelerated or halted and when the driver performs no avoidance action such as releasing a accelerator or pressing the brake pedal, the vehicle control system controls the throttle valve 76 of the brake system 1 to close it. As a result, the driving force of the primary vehicle is decreased and sufficient negative pressure is supplied to the brake booster 6. Therefore, even when the driver's judgment is delayed and the harsh braking is performed, sufficient vehicle braking force may be applied to the primary vehicle. In addition, since the throttle valve is forcibly closed, driving force of the primary vehicle is suppressed even when the accelerator pedal keeps being depressed. It can be expected that the vehicle control system according to the invention have the excellent effect when distance between vehicles is relatively small (such as when driving in traffic jam or on a city road and when the brake pedal is pressed frequently) because the driver's attention tends to be distracted from driving under such traffic conditions.

Although some preferred embodiments have been described with reference to drawings, it is not intended to limit the scope of the invention to such embodiments. For example, instead of closing the throttle valve 76, the vehicle control system may decelerate or brake the primary vehicle directly without waiting for the response by the driver, or simply issue an alarm to the driver. Images captured when a driver presses an accelerator may be stored as templates. In this case, when the distance between vehicles gets wider, the vehicle control system may accelerate the primary vehicle. Further, detection of approach of the vehicle is not limited for front vehicle but for side vehicle or back vehicle by modifying an installation position of a camera and calculation of an evaluation value B. The vehicle control system according to the invention may also be applied to a two-wheel vehicle instead of a four-wheel vehicle.

According to the invention, since a template update means is provided for updating templates every time a brake pedal is pressed by the driver, a vehicle control system may be realized with relatively small storage capacity for flexibly adapting with the personal character of the driver and the conditions surrounding the primary vehicle.

What is claimed is:

1. A vehicle control system adapted for mounting on a primary vehicle for detecting the approach of another vehicle to perform a collision avoidance action, comprising:

capturing means for capturing an external image viewed from the primary vehicle;

template memory means for storing templates for detecting the approach of the another vehicle;

template update means for updating the templates when a brake pedal is pressed by a driver;

recognizing means of comparing the external image with the updated template and calculating an evaluation value to determine whether the another vehicle approaches the primary vehicle based on the result of said comparing; and instruction means for instructing the vehicle to perform the collision avoidance action when said evaluation value exceeds a threshold value.

2. The vehicle control system according to claim 1, wherein said template is composed of a plurality of sub-regions, each of said sub-regions having an eigen value.

3. The vehicle control system according to claim 2, wherein said recognizing means compares the image with the template for each sub-region to calculate a similarity factor of each sub-region, wherein said recognizing means calculates optical flows based on the image and multiplies said similarity factor by said optical flows to calculate a feature value for each sub-region, and wherein said recognizing means adds all of the feature values and weights assigned to sub-regions to calculate said evaluation value.

4. The vehicle control system according to claim 3, wherein said eigen value is a pixel intensity value, and wherein said similarity factor is calculated by comparing an arithmetic mean value of the pixel intensity values contained in each sub-region of the image with the eigen value of each sub-region of the template.

5. The vehicle control system according to claim 4, wherein said template memory means stores a template set composed of a template with a positive weight and a template with a negative weight.

6. The vehicle control system according to claim 5, wherein said template set includes three different sets for turning left/right or traveling straight depending on traveling direction of the primary vehicle, wherein said template update means updates the template in the template set corresponding to traveling direction of the vehicle, and wherein said recognizing means calculates said evaluation value with respect to the template in the template set corresponding to the traveling direction of the vehicle.

7. The vehicle control system according to claim 6, wherein said template update means increases the weight for the sub-region containing approach information of said another vehicle, and wherein said template update means updates the template so that the eigen value of said sub-region gets close to the value of the corresponding sub-region in the image.

8. The vehicle control system according to claim 1, wherein said collision avoidance action includes forcibly closing a throttle valve of a brake system of the vehicle.

9. A vehicle control program product for detecting the approach of another vehicle to a primary vehicle, said program performing a collision avoidance action when executed on a computer, comprising:

capturing an external image viewed from the primary vehicle;

comparing the external image with a template prepared for detecting the approach of the another vehicle;

calculating an evaluation value to determine whether the another vehicle approaches the primary vehicle based on the result of said compairing;

instructing the primary vehicle to perform the collision avoidance action when said evaluation value exceeds a threshold value; and updating said template when a brake pedal is pressed by a driver.

10. The vehicle control program product according to claim 9, wherein said template is composed of a plurality of sub-regions, each of said sub-regions having an eigen value.

11. The vehicle control program product according to claim 10, wherein said comparing includes comparing the image with the template for each sub-region to calculate a similarity factor of each sub-region, wherein said calculating includes calculating optical flows based on the image and multiplying said similarity factor by said optical flows to calculate a feature value for each sub-region, and wherein said calculating process further includes adding all of the feature values and weights assigned to sub-regions to calculate said evaluation value.

12. The vehicle control program product according to claim 11, wherein said eigen value is a pixel intensity value, and wherein said similarity factor is obtained by comparing an arithmetic mean value of the pixel intensity values contained in each sub-region of the image with the eigen value of each sub-region of the template.

13. The vehicle control program product according to claim 12, wherein said template is stored as a template set composed of a template with a positive weight and a template with a negative weight.

14. The vehicle control program product according to claim 13, wherein said template set includes three different sets for turning left/right or traveling straight depending on traveling direction of the primary vehicle, wherein said updating includes updating the template in the template set corresponding to traveling direction of the primary vehicle, and wherein said calculating includes calculating said evaluation value with respect to the template in the template set corresponding to the traveling direction of the primary vehicle.

15. The vehicle control program product according to claim 14, wherein said updating includes increasing the weight for the sub-region containing approach information of said another vehicle, and wherein said updating further includes updating the template so that the eigen value of said sub-region gets close to the value of the corresponding sub-region in the image.

16. The vehicle control program product according to claim 9, wherein said collision avoidance action includes forcibly closing a throttle valve of a brake system of the vehicle.

17. A vehicle control method for detecting the approach of another vehicle to a primary vehicle to perform a collision avoidance action, comprising the steps of:

capturing an external image from the primary vehicle;

comparing the external image with a template prepared for detecting the approach of the another vehicle;

calculating an evaluation value to determine whether the another vehicle approaches the primary vehicle based on the result of said comparing;

instructing the primary vehicle to perform the collision avoidance action when said evaluation value exceeds a threshold value; and updating said template when a brake pedal is pressed by a driver.

18. The vehicle control method according to claim 17, wherein said template is composed of a plurality of sub-regions, each of said sub-regions having an eigen value.

19. The vehicle control method according to claim 18, wherein said comparing step includes comparing the image with the template for each sub-region to calculate a similarity factor of each sub-region, wherein said calculating step includes calculating optical flows based on the image and multiplying said similarity factor by said optical flows to calculate a feature value for each sub-region, and wherein said calculating step further includes adding all of the feature values and weights assigned to sub-regions to calculate said evaluation value.

20. The vehicle control method according to claim 19, wherein said eigen value is a pixel intensity value, and wherein said similarity factor is obtained by comparing an arithmetic mean value of the pixel intensity values contained in each sub-region of the image with the eigen value of each sub-region of the template.

21. The vehicle control method according to claim 20, wherein said template is stored as a template set composed of a template with a positive weight and a template with a negative weight.

22. The vehicle control method according to claim 21, wherein said template set includes three different sets for turning left/right or traveling straight depending on traveling direction of the primary vehicle, wherein said updating step includes updating the template in the template set corresponding to traveling direction of the primary vehicle, and wherein said calculating step includes calculating said evaluation value with respect to the template in the template set corresponding to the traveling direction of the primary vehicle.

23. The vehicle control method according to claim 22, wherein said updating step includes increasing the weight for the sub-region containing approach information of said another vehicle, and wherein said updating step further includes updating the template so that the eigen value of said sub-region gets close to the value of the corresponding sub-region in the image.

24. The vehicle control method according to claim 17, wherein said collision avoidance action includes forcibly closing a throttle valve of a brake system of the vehicle.

* * * * *

UNITED STATES PATENT AND TRADEMARK OFFICE
CERTIFICATE OF CORRECTION

PATENT NO. : 6,847,894 B1
DATED : January 25, 2005
INVENTOR(S) : Yuji Hasegawa

It is certified that error appears in the above-identified patent and that said Letters Patent is hereby corrected as shown below:

Title page,
Item [56], References Cited, U.S. PATENT DOCUMENTS, please insert the following:

-- US 2003/0138146
   US 2003/0031367
   US 6,590,521
   US 5,757,287
   US 2001/0012982 --

Item [57], ABSTRACT,
Line 14, should read as -- forcibly closed to inhibit accelerator control, and braking --

Signed and Sealed this

Third Day of May, 2005

JON W. DUDAS
*Director of the United States Patent and Trademark Office*